Figure 1:
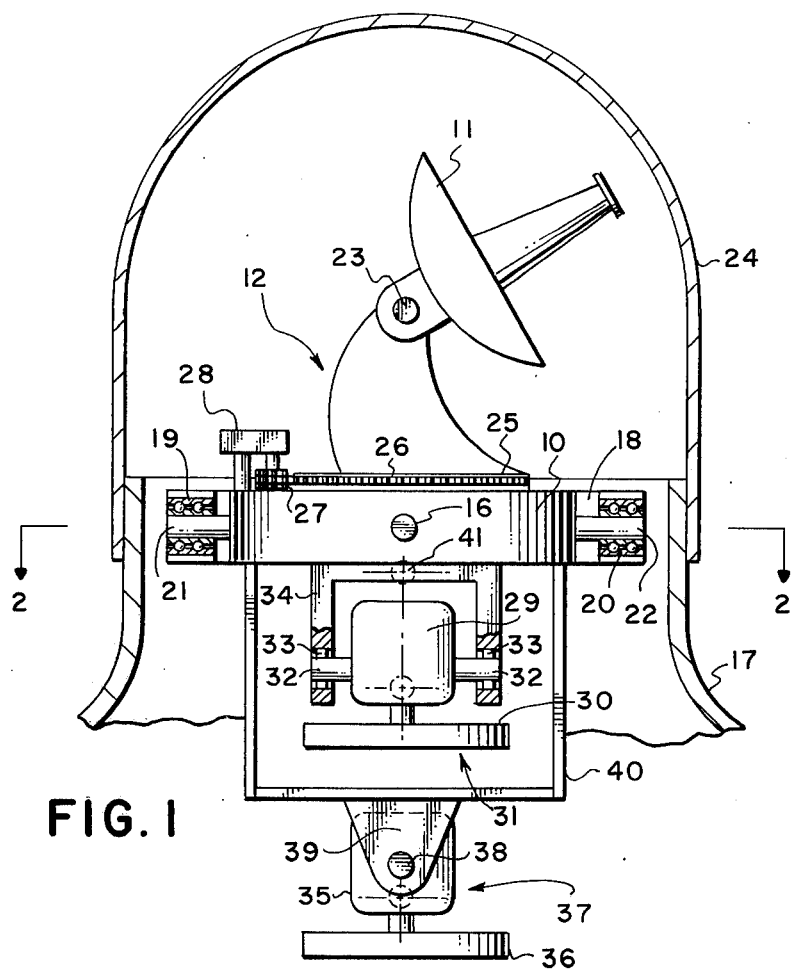

United States Patent [19]

Bieser et al.

[11] 4,020,491
[45] Apr. 26, 1977

[54] COMBINATION GYRO AND PENDULUM WEIGHT PASSIVE ANTENNA PLATFORM STABILIZATION SYSTEM

[75] Inventors: Albert H. Bieser, Garland; William B. Stuhler, Plano; Dorsey T. Smith, Garland, all of Tex.

[73] Assignee: B. E Industries, Garland, Tex.

[22] Filed: Oct. 7, 1974

[21] Appl. No.: 512,530

[52] U.S. Cl. .............................. 343/765; 33/318; 33/321; 74/5.22; 74/5.42

[51] Int. Cl.² ........................................ H01Q 1/18

[58] Field of Search ............... 33/275 G, 318, 320, 33/321; 74/5 F, 5.34, 5.22, 5.42; 343/765, 766

[56] References Cited

UNITED STATES PATENTS

| | | | |
|---|---|---|---|
| 1,324,477 | 12/1919 | Tanner | 74/5.34 |
| 1,573,343 | 2/1926 | Holeka | 74/5.34 |
| 2,477,574 | 8/1949 | Braddon | 343/765 |
| 3,355,954 | 12/1967 | Levine et al. | 74/5.34 |

FOREIGN PATENTS OR APPLICATIONS

| | | | |
|---|---|---|---|
| 864,751 | 4/1961 | United Kingdom | 343/765 |
| 890,264 | 2/1962 | United Kingdom | 343/765 |

*Primary Examiner*—Eli Lieberman
*Attorney, Agent, or Firm*—Warren H. Kintzinger

[57] ABSTRACT

A multi-axis antenna pedestal with two controlled axes configured with elevation over azimuth on a gravity and gyro stabilized platform. The assembly is suspended with right-angled pivotal axes in substantially the same horizontal plane, and structure pivoted about the upper two controlled axes is statically balanced and the center of gravity of the entire pivotally mounted assembly is on the vertical axis and below the gimbal plane. The platform structure includes at least one gyro motor and rotor system pivotally mounted in the platform structure on an axis parallel to one of the right angled pivotal axes of the platform pivotal mounting. The center of gravity of the one gyro motor and rotor system is below its pivotal mounting in the platform structure, and when two such gyro motor and rotor systems are employed the pivotal mounting axes of each parallels an individual axis of the platform pivotal mounting.

22 Claims, 7 Drawing Figures

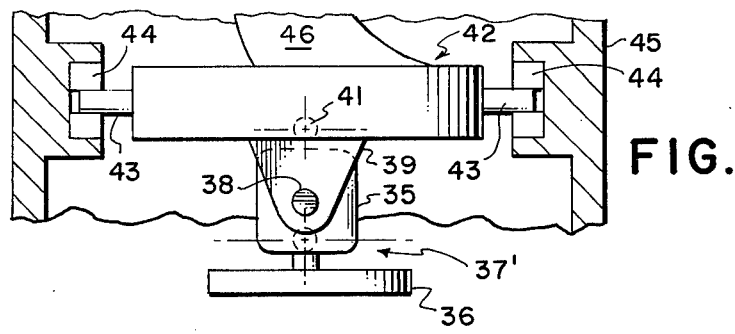
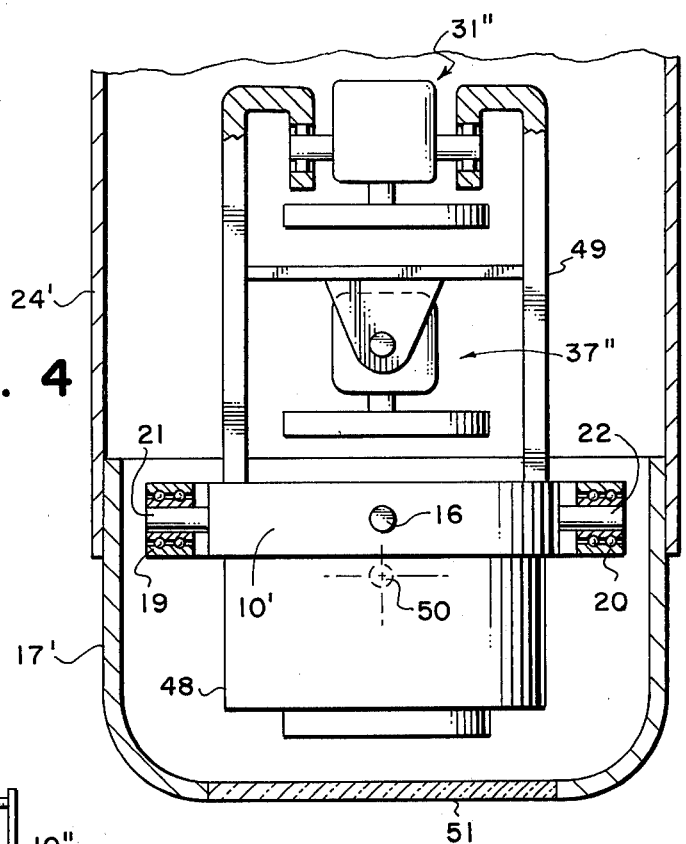
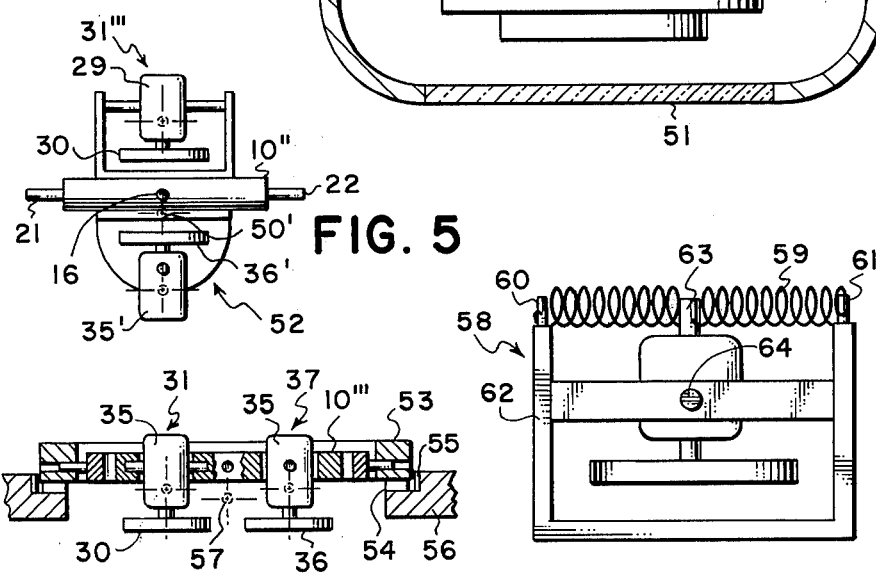
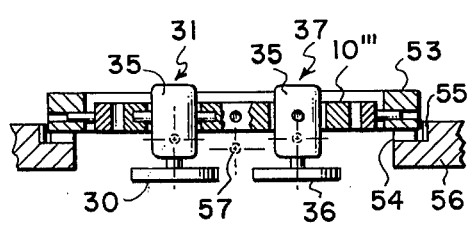

COMBINATION GYRO AND PENDULUM WEIGHT PASSIVE ANTENNA PLATFORM STABILIZATION SYSTEM

This invention relates in general to stabilized platform systems, and in particular, to combination gyro and pendulum weight passive antenna, photographic or scientific equipment mounting stabilized platform structures. Some operating conditions and problems responded to by this case are also faced by a co-pending application, Ser. No. 396,513, filed Sept. 12, 1973, now U.S. Pat. No. 3,893,123, by one of the co-inventors hereof and entitled "Combination Gyro and Pendulum Weight Stabilized Platform Antenna System," but with significant structural differences in the teachings between the two cases.

Much as has been stated with the earlier filed case, there are many requirements for tracking antennas, or for photographic equipment mounted on stabilized platforms in aircraft installations, for both military and commercial applications. These include, for example, satellite tracking shipboard maritime applications, and also in airborne use for either antennas or photographic equipment. Tracking antenna systems being supplied to meet present military needs are generally sophisticated and relatively expensive, as compared to system costs acceptable for many commercial applications, and even some military applications. There is a significant market developing for relatively low cost but reliable antenna systems, particularly with the new L band frequencies allocated recently for maritime satellite communication.

Such antennas must first acquire, through some form of control that may be remote control, the desired target, such as a communication satellite in stationary earth orbit requiring, as a minimum, elevation and azimuth control. Once the target has been acquired, the pointing attitude of the antenna must be updated for changes in ship's heading and ship's position. Ship's heading changes are usually automatically compensated in the azimuth axis that may be slaved to a ship's compass, and ship's position changes, which are relatively insignificant over short time periods, are, with many installations, updated manually. (A 100 mile headway represents less than 2° tracking error.) The problems are further intensified when two primary ship motion disturbances, pitch and roll, are considered. These motions require that the antenna control system automatically compensate for angular changes, quickly and pecisely, to avoid excessive pointing errors. While 1° of pointing error may be unacceptable to many high performance, narrow beam, military systems, a 6° or even a 10° error may be far from catastrophic in a wide beam L band system with a nominal gain of 12 – 14 db when the system is designed with enough margin to tolerate a 0.5 or 1.0 db degradation under certain "worst conditions."

Two-axes and three-axes tracking antenna mounts do not achieve desired objectives. The two-axes pedestal is inherently limited to less than full hemispherical coverage by the "key-hole" effect when the target is near a line extension of the primary axis where accelerations required for corrective motions become intolerable. A three-axes pedestal antenna mounting provides full hemispherical coverage with, however, added conplexity and cost with the control systems required being highly sophisticated, having a closed loop servo control for each axis along with the associated rate-gyros, accelerometers and other equipment, at times even including a digital computer to perform the complex coordinate conversions.

Tethered balloons, while advantageously capable of supporting antennas at great height (3,000 ft. as a practical example, and even higher), encounter problems imposing antenna system requirements in common with shipboard use. Motions imposed on a balloon-supported antenna system are typically: pitch, 0° to 25°, variable at 6°, maximum roll ±10° (3° per second, maximum), and yaw ±15° (5° per second, maximum, with respect to wind direction). While selected aerodynamically shaped balloons give highly stable yaw, pitch and roll performance, the balloon platform is not position-fixed from an antenna point of view, and also experiences wind drift because it is tethered. Close control of the direction of high frequency receiving and transmitting antennas is important in implementing a system using balloon-supported signal communicating antennas. This requires a stable microwave antenna platform capable of compensating for specific anomalies introduced through balloon support along with direction and velocity change induced variations. Further, an acceptable mean time between failures is extremely important with antenna systems usage, both in such airborne use and in maritime use.

It is important to establish vertical reference aboard ships and to attenuate roll and pitch motion in stabilizing antennas and/or instruments. The passive antenna stabilization system has been developed to provide a relatively simple, reliable, and economic stabilized platform structure to stabilize directional antennas aboard moving vehicles. This includes ships of all types, tethered balloon relay stations, floating off-share drilling platforms, land vehicles, and some airborne vehicles.

It is, therefore, a principal object of this invention to provide a combination gyro and pendulum weight passive platform stabilization system establishing vertical reference for the platform and equipment mounted on the platform with respect to at least one pivotal mounting axis.

Another object is for such a passive platform stabilization vertical reference system to compensate pitch and roll about two-pivotal axes.

A further object is to provide a relatively simple, reliable, and economic stabilized platform structure as a mounting for equipment such as directional antennas, cameras, and other scientific gear.

Still further objects include high reliability with no gear drives used in the platform stabilization system, no servo amplifiers, rate gyros, accelerometers and/or resolvers, generally no D.C. motors and associated brushes, and no required interface with a carrying ship's instrumentation or control.

Features of this invention useful in accomplishing the above objects include, in the pitch and roll platform, stabilization systems, use of two vertical axis flywheels (gyros) to stabilize the primary pitch and roll axis independently. This is accomplished by allowing the flywheels (gyros) to precess through a limited angular displacement without disturbing the primary pitch or roll axis. The gyros are essentially balanced about their pivot axes with only a very slight bias of the flywheel toward gravity. A controlled friction or low friction suspension system is used for the gyro pivots to prevent the gravity bias from pecessing the stable axes. Stated another way, the gyro axis, once displaced from vertical, will precess through the controlled low friction system to minimize the error in the stable axis. This gives, in effect, the equivalent of a mechanical filter capable of storing a finite amount of energy, in one direction, and playing it back when energy is applied in the opposite direction. It is a system especially effective in application aboard ships since the sum of roll and pitch motions are, respectively, substantially always approximately zero when referenced to gravity.

Specific embodiments representing what are presently regarded as the best modes of carrying out the invention are illustrated in the accompanying drawings.

Figure 2:
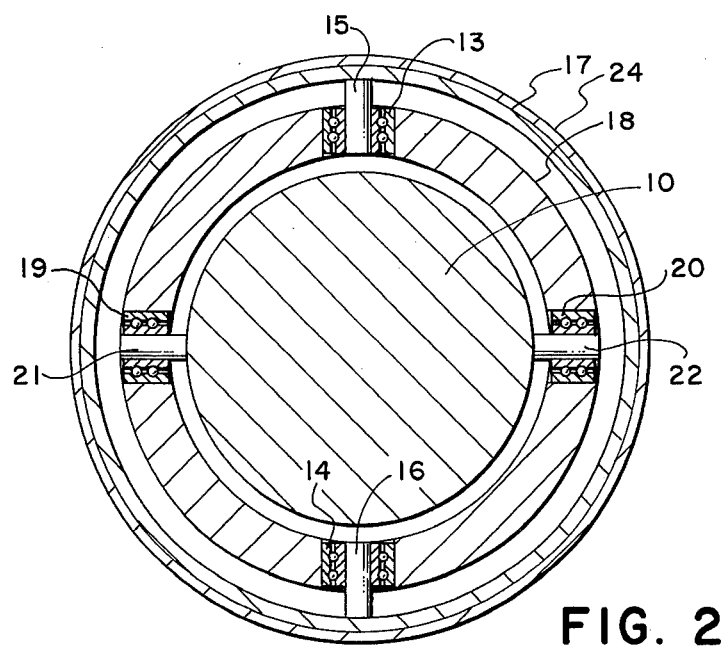

In the drawings:

FIG. 1 represents a partially broken away and sectioned side elevation view of a microwave antenna, multi-axis antenna mount pedestal system with a right angled axis gimbaled combination gravity and gyro stabilized platform;

FIG. 2, a horizontal section taken along line 2—2 of FIG. 1, showing right angled axes gimbaled mounting detail;

FIG. 3, a partially broken away and sectioned side elevation view of a single pivotal axis mounted combination gravity and gyro stabilized platform;

FIG. 4, a partially broken away and sectioned side elevation view of an airborne camera mounted to the bottom of a right angled axis gimbaled combination gravity and gyro stabilized platform;

FIG. 5, a partial side elevation view of a right angled axis gimbaled combination gravity and gyro stabilized platform with a gyro motor and rotor mounted both above and below the platform;

FIG. 6, a partially broken away and sectioned side elevation view of a stabilized platform with right angle pivotal axis mounted gyro motor and rotor units pivotally mounted substantially at the pivotal axis plane of the gimbaled platform within a rotation mounting ring; and FIG. 7, a gyro motor and rotor unit, that may be used in place of those shown in various embodiments, having a spring precession restraining structure.

Referring to the drawings:

The platform 10 of the antenna 11 support structure 12 of FIG. 1 is shown (referring also to FIG. 2) to be gimbal-supported with two support bearings 13 and 14 rotatable about bearing support spindles 15 and 16 fixed to project inwardly on the same axis from opposite sides of the fixed mount housing 17. The bearings 13 and 14 support gimbal ring 18 that in turn has two bearings 19 and 20 supported by the ring 18 on an intersecting axis at right angles to and co-planar with the axis of bearings 13 and 14. The bearings 19 and 20 rotatably support spindles 21 and 22 that are mounted to project outwardly from opposite sides of gimbaled platform 10 on a common axis. The antenna 11 is mounted to pivot about elevation axis 23 in an elevation over azimuth configuration, to be described in greater detail later, contained within a protective radome 24 mounted on housing 17 in a conventional manner (Detail not shown.). The antenna pedestal structure 12 also includes an antenna mount azimuth rotatable base 25 supported on a gimbaled platform 10 for rotation about the vertical azimuth axis as azimuth setting adjustments are being made. Rotatable base 25 has an annular spur gear 26 driven by pinion gear 27 of azimuth rotation drive 28, that may be driven by a synchro drive system (Detail not shown.). A gyro motor 29 and rotor 30 until 31 is pivotally mounted with pivot spindles 32 in bearings 33 of mount frame 34 with a pivot axis parallel to the gimbal pivot axis of spindles 21 and 22. Gyro motor 35 and rotor 36 until 37 is pivotally mounted with pivot spindles 38 in bearings of mount frame 39, in turn, mounted by a mounting frame 40 below unit 31. The units 31 and 37 are aligned along a vertical azimuth axis line through the center of the platform 10 that has a center of gravity location 41 below both pivot axes of the gimbaled platform. Further, each of the gyro motor and rotor units are shown to have centers of gravity below their respective pivotal mountings.

With the embodiment of FIG. 3, a "roll only[ single pivotal axis mounted combination gravity and gyro stabilized platform 42 is provided. Here, single pivot axis spindles 43 are rotatably supported by bearings 44 mounted in frame enclosure 45. A gyro motor 35 and rotor 36 unit 37' is mounted with spindles 38 rotatably mounted in frame member 39 that is mounted on the bottom of platform 42. The overall platform 42 structure with unit 37' on the bottom and an antenna structure 46 mounted on the top has a center of gravity location 41 below the pivotal axis mounting of the platform, and gyro unit 37' is shown to have its center of gravity below its pivotal mounting.

Referring now to FIG. 4, a camera 48 is mounted on the bottom of platform 10' that is gimbal-mounted the same as platform 10 of FIGS. 1 and 2, with like parts numbered the same, as a matter of convenience. In this embodiment with gyro motor and rotor units 31" and 37" each single axis rotatably mounted one above the other in platform frame structure 49 and in line with a vertical azimuth line in a symmetrically balanced assembled structure the center of gravity location 50 is below the gimbal mounting pivotal axes. With the stabilized platform 10' mounted camera 48 facing downward, a transparent window section 51 is provided in enclosure frame portions 17' that is mounted in turn in frame enclosure 24'.

With the embodiment of FIG. 5, a gyro motor and rotor unit 31''' is mounted to the top of platform 10" with rotor 30 down from motor 29, and gyro motor and rotor unit 52 is mounted to the bottom of platform 10" with rotor 36' above motor 35'. Again the center of gravity location 50' is below the gimbal mounting pivotal axes of platform 10".

In the embodiment of FIG. 6, the gyro motor and rotor units 31 and 37 are pivotally mounted within the platform 10''' with their pivotal axes substantially on the plane of right angled gimbaled pivotal axes mounting of the platform. The platform 10'''' gimbal mounting ring 53 is supported by ring bearing 54 and restrained within cylindrical bearing 55, both mounted in frame member 56 for rotation in azimuth with highly maneuvaerable vehicles. This feature could be adapted to others of the embodiments shown for the same reasons. This is a symmetrically balanced unit with the side-by-side spaced positioning of the gyro units 31 and 37, and the center of gravity location 57 is also below the gimbal pivotal mounting axes with this embodiment just as with the other embodiments.

The gyro motor and rotor unit 58 of FIG. 7 is a gyro unit employing a spring structure 59 connected between frame extensions 60 and 61 of frame unit 62. The center of the spring structure 59 is connected to projection 63 of the gyro unit 58 to urge the unit back to a center erect position in pivoting about pivot axis 64 any time there is any departure from the erect vertical state thereof. This spring precession restraining structure may be employed with units 58 as a replacement for gyro units 31 and 37 using a lower center of gravity than their respective pivotal mountings as the precession restraining means therefor. Dashpots could be used in other embodiments at one or more axes to retard or compensate for forces and/or disturbances. It should be noted that one could employ structural means to temporarily lock or retard the gyro pivot axis at or near the vertical axis, in the various embodiments, to minimize torquing errors during rapid turning maneuvers.

Springs, in addition to the use of springs as shown with the gyro and rotor unit 58 of FIG. 7 spring structures, may be used in various embodiments at one or more axes to retard or compensate for forces and/or disturbances. It is of interest to note that the "roll only" platform approach of the FIG. 3 embodiment is an excellent approach for very large ships where pitch error is a non-critical factor that can be ignored.

Whereas this invention is herein illustrated and described with respect to several embodiments hereof, it should be realized that vaious changes may be made without departing from essential contributions to the art made by the teachings hereof.

We claim:

1. In a combination gyro and pendulum weight stabilized passive stabilization system: a platform structure pivotally mounted with respect to one or more pivotal axes lying in a pivotal axis plane and having a center of gravity below said pivotal axis plane; a gyro motor means and rotor means associated with at least one of said pivotal axes and pivotally mounted by pivot means in said platform structure on a gyro mounting pivotal axis substantially parallel to an associated reference axis which is perpendicular to an individual one of the pivotal axes of the pivotal mounting of said platform structure; with said gyro motor means and rotor means having precession restaining means; and when erect, the gyro rotor means being rotational in a plane normal to a vertical axis.

2. The combination gyro and pendulum weight stabilized platform of claim 1, wherein said precession restraining means comprises positioning of the center of gravity of said gyro motor means and rotor means below its pivotal axis.

3. The combination gyro and pendulum weight stabilized platform of claim 2, with the gyro rotor means above said gyro motor means.

4. The combination gyro and pendulum weight stabilized platform of claim 2, with the gyro motor means above said gyro rotor means.

5. The combination gyro and pendulum weight stabilized platform of claim 1, wherein said platform structure pivotal mounting axis perpendicular to said associated axis reference comprises first and second mutually perpendicular pivotal axes laying in said pivotal axis plane.

6. The combination gyro and pendulum weight stabilized platform of claim 5, wherein said second pivotal axis is substantially co-existant with said reference perpendicular to said first pivotal axis.

7. The combination gyro and pendulum weight stabilized platform of claim 5, with first and second gyro motor means and rotor means respectively mounted in said platform structure by pivot means having mutually perpendicular pivot axes laying in respective parallel planes.

8. The combination gyro and pendulum weight stabilized platform of claim 7, wherein the center of gravity of said first gyro motor means and rotor means is located below its pivotal mounting axis as said precession restraining means.

9. The combination gyro and pendulum weight stabilized platform of claim 8, wherein the center of gravity of said second gyro motor means and rotor means it located below its pivotal mounting axis as the precession restraining means of said second cyro motor means and rotor means.

10. The combination gyro and pendulum weight stabilized platform of claim 7, wherein both said first and second gyro motor means and rotor means are mounted below both said first and second pivotal mounting axis of said platform structure.

11. The combination gyro and pendulum weight stabilized platform of claim 7, wherein both said first and second gyro motor means and rotor means are mounted above said first and second pivotal mounting axis of said platform structure.

12. The combination gyro and pendulum weight stabilized platform of claim 7, wherein the pivotal mounting axis of at least one of said gyro motor means and rotor means is above said first and second pivotal mounting axis of said platform structure.

13. The combination gyro and pendulum weight stabilized platform of claim 7, wherein the pivotal mounting axis of at least one of said first gyro motor means and rotor means is below said first and second pivotal mounting axis of said platform structure.

14. The combination gyro and pendulum weight stabilized platform of claim 7, wherein the pivotal mounting axis of at least one of said gyro motor means and rotor means is coplanar with both said first and second pivotal axis of said platform structure pivotal mounting.

15. The combination gyro and pendulum weight stabilized platform of claim 7, wherein said first and second gyro motor means and rotor means are vertically aligned one above the other.

16. The combination gyro and pendulum weight stabilized platform of claim 7, wherein said first and second gyro motor means and rotor means are mounted in said platform structure in spaced, side-by-side, relation.

17. The combination gyro and pendulum weight stabilized platform of claim 7, wherein said first and second gyro motor means and rotor means are, respectively, above and below said first and second pivotal mounting axis of said platform structure.

18. The combination gyro and pendulum weight stabilized platform of claim 17, wherein said first and second gyro motor means and rotor means are in reverse vertical orientation, one to the other, one with rotor means over the motor means and the other with motor means over rotor means.

19. The combination gyro and pendulum weight stabilized platform of claim 7, wherein said platform structure is pivotally mounted in turn table means mounted for rotation by bearing means in a frame turntable bearing support structure.

20. The combination gyro and pendulum weight stabilized platform of claim 1, wherein said platform structure is an antenna mounting structure with the center of gravity of the platform and antenna assembly being a center of gravity below said pivotal axis plane.

21. The combination gyro and pendulum weight stabilized platform of claim 5, wherein said platform structure is an antenna mounting structure with the center of gravity of the platform and antenna assembly being a center of gravity below both said first and second pivotal axis of said platform structure.

22. The combination gyro and pendulum weight stabilized platform of claim 1, wherein said precession restraining means comprises spring means interconnected between said gyro motor means and rotor means and frame means in the platform structure.

* * * * *